United States Patent
Fleischhacker

(10) Patent No.: US 10,486,603 B2
(45) Date of Patent: Nov. 26, 2019

(54) LUGGAGE COMPARTMENT ARRANGEMENT FOR A MOTOR VEHICLE

(71) Applicant: Dr. Ing. h.c. F. Porsche Aktiengesellschaft, Stuttgart (DE)

(72) Inventor: Robert Fleischhacker, Tiefenbronn-Muehlhausen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/945,750

(22) Filed: Apr. 5, 2018

(65) Prior Publication Data

US 2018/0319344 A1    Nov. 8, 2018

(30) Foreign Application Priority Data

May 4, 2017    (DE) .................... 10 2017 109 524

(51) Int. Cl.
*B60R 5/04*    (2006.01)
*B60R 7/02*    (2006.01)
*B60R 11/00*    (2006.01)

(52) U.S. Cl.
CPC .............. *B60R 5/047* (2013.01); *B60R 7/02* (2013.01); *B60R 2011/0082* (2013.01)

(58) Field of Classification Search
CPC ............ B60N 5/047; B60R 5/047; B60R 7/02
USPC ..... 296/37.16; 160/242, 244, 245, 248, 266, 160/267.1, 269, 270–272, 273.1, 275, 160/290.1, 293.1, 294
See application file for complete search history.

(56) References Cited

U.S. PATENT DOCUMENTS 5,056,858 A * 10/1991 Tanaka .................. B60R 7/02
                                                         292/244
10,173,597 B2 * 1/2019 Maier .................... B60R 5/047

FOREIGN PATENT DOCUMENTS

| DE | 10357153 A1 | 7/2005 |
| DE | 102004021556 A1 | 12/2005 |
| GB | 2469682 A | 10/2010 |
| JP | H 11245731 A | 9/1999 |

* cited by examiner

*Primary Examiner* — Dennis H Pedder
(74) *Attorney, Agent, or Firm* — Leydig, Voit & Mayer, Ltd.

(57) ABSTRACT

A luggage compartment arrangement for a motor vehicle includes an extendable roller blind configured to cover and/or secure a load in a luggage compartment and a guide system configured to guide, in a position-variable manner, a winding spindle of the roller blind. The winding spindle of the roller blind is shiftable in the guide system at least with one portion in the vertical direction.

9 Claims, 3 Drawing Sheets

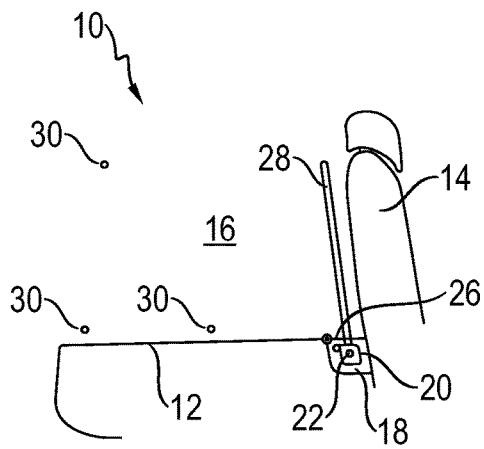
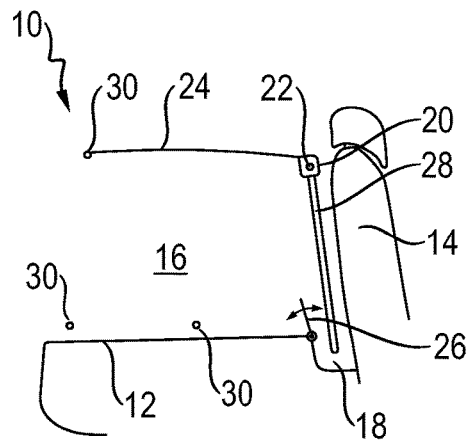
Fig. 1  Fig. 2
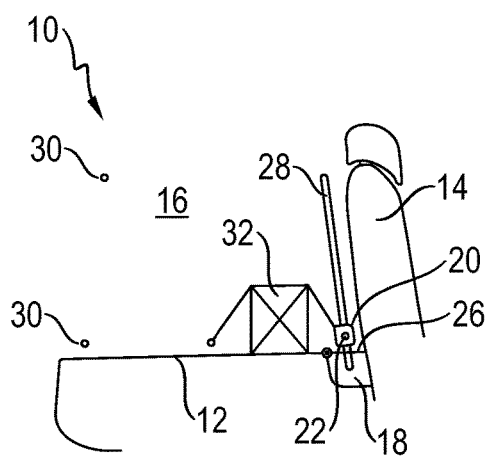
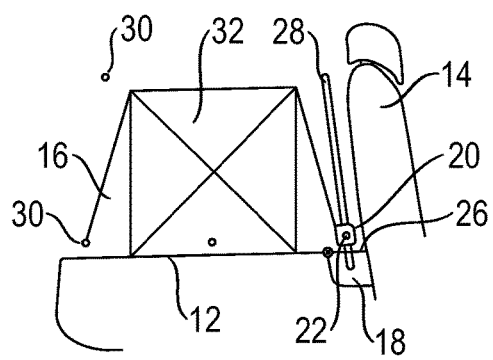
Fig. 3  Fig. 4

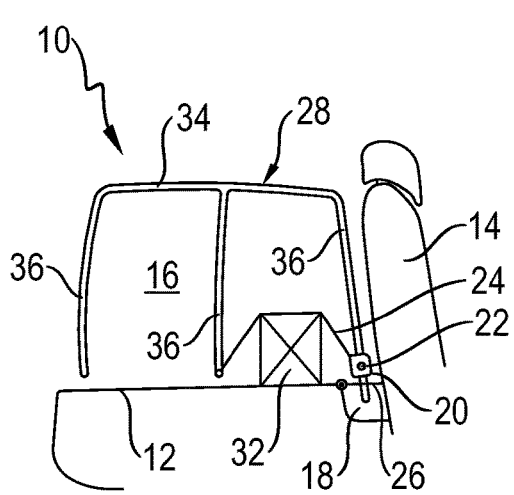
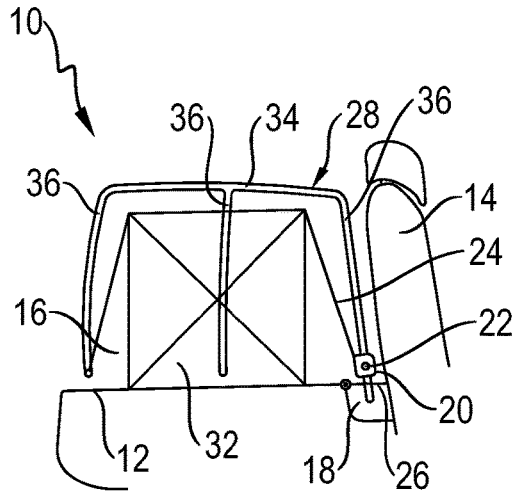
Fig. 9      Fig. 10
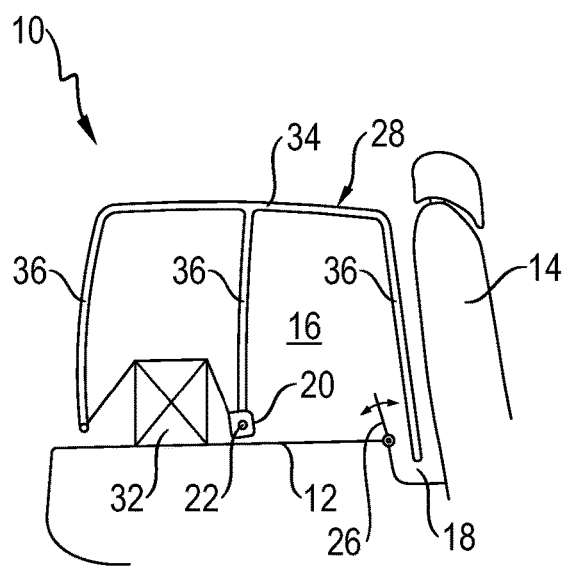
Fig. 11

LUGGAGE COMPARTMENT ARRANGEMENT FOR A MOTOR VEHICLE

CROSS REFERENCE TO RELATED APPLICATIONS

This application claims benefit to German Patent Application No. DE 10 2017 109 524.1, filed May 4, 2017, which is hereby incorporated by reference herein.

FIELD

The invention relates to a luggage compartment arrangement for a motor vehicle, with the aid of which a load can be transported in a luggage compartment, in particular for a trunk, of a motor vehicle.

BACKGROUND

GB 2 469 682 A discloses a luggage compartment arrangement for a trunk of a motor vehicle, in which a receiving cassette with a roller blind can be fastened at various points of a trunk in a fixed manner in terms of movement in order, with the aid of the extended roller blind, to cover a load and to fix the load by means of a fastening to another point of the luggage compartment.

DE 10 2004 021 556 A1 discloses a luggage compartment arrangement for a trunk of a motor vehicle, in which a receiving cassette with a roller blind can be displaced in a guide system in the direction of travel of the motor vehicle in order to be able to divide the trunk individually into differently sized subregions.

SUMMARY

In an embodiment, the present invention provides a luggage compartment arrangement for a motor vehicle. The luggage compartment arrangement includes an extendable roller blind configured to cover and/or secure a load in a luggage compartment and a guide system configured to guide, in a position-variable manner, a winding spindle of the roller blind. The winding spindle of the roller blind is shiftable in the guide system at least with one portion in a vertical direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a schematic lateral sectional view of a first embodiment of a luggage compartment arrangement in a first state;

FIG. 2 is a schematic lateral sectional view of the luggage compartment arrangement from FIG. 1 in a second state;

FIG. 3 is a schematic lateral sectional view of the luggage compartment arrangement from FIG. 1 in a third state;

FIG. 4 is a schematic lateral sectional view of the luggage compartment arrangement from FIG. 1 in a fourth state;

FIG. 9 is a schematic lateral sectional view of the luggage compartment arrangement from FIG. 5 in a fifth state;

FIG. 10 is a schematic lateral sectional view of the luggage compartment arrangement from FIG. 5 in a fifth state; and FIG. 11 is a schematic lateral sectional view of the luggage compartment arrangement from FIG. 5 in a sixth state.

DETAILED DESCRIPTION

Figure 5:
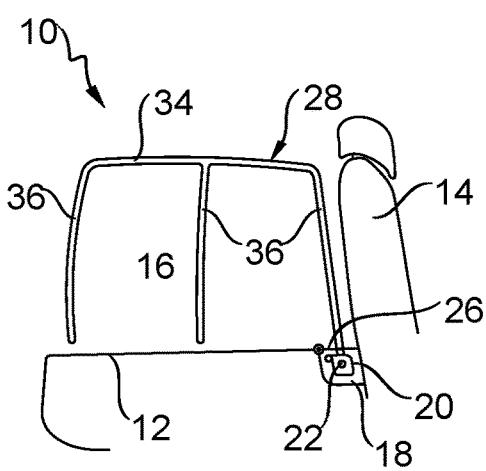
FIG. 5 is a schematic lateral sectional view of a second embodiment of a luggage compartment arrangement in a first state.

There is a constant need to securely transport different loads in a luggage compartment of a motor vehicle.

Embodiments of the invention permit secure transport of different loads in a luggage compartment of a motor vehicle.

An embodiment of the invention provides a luggage compartment arrangement for a motor vehicle, comprising an extendable roller blind for covering and/or securing a load in a luggage compartment, and a guide system for the position-variable guidance of a winding spindle of the roller blind, wherein the winding spindle of the roller blind is shiftable in the guide system at least with one portion in the vertical direction.

When the roller blind is wound up about the winding spindle, a load can easily be loaded into the luggage compartment without striking against the roller blind or being blocked by the roller blind during movement. When the load has reached the desired position in the luggage compartment, the roller blind can be extended and fastened at the extended end in the luggage compartment. It is possible here for the roller blind to be positioned at a distance from the load and to merely overlap the load, as a result of which the roller blind can upwardly delimit the luggage compartment in the manner of a rear parcel shelf. In particular, the extended end of the roller blind can be fastened at a height level which lies below the upper end of the load. The roller blind can thus press against the load from above and can push the load onto a luggage platform of the luggage compartment and hold down said load. The load can thereby be fixed and secured, and therefore secure transport of the load can be achieved. It is possible here by means of the guide system to shift the winding spindle of the roller blind in the vertical direction such that the roller blind can be extended from different height levels. As a result, it is, for example, possible, for a smaller load, to position the winding spindle of the roller blind particularly close to the luggage platform and to fasten the extended end of the roller blind to the luggage platform on that side of the load which points away from the winding spindle, and therefore even a load having a low height can readily be secured. In the case of a large load, the winding spindle can be positioned at a higher height level spaced apart from the luggage platform, and the extended end of the roller blind can be fastened to the luggage platform on that side of the load which points away from the winding spindle, and therefore the load can be pressed and secured against the luggage platform and against a front delimitation of the luggage compartment, for example a rear side of a rear seat bench. The risk of damage to the roller blind by the load can thereby be reduced. In addition, the maximum length of the roller blind can be kept small. The vertical position of the winding spindle of the roller blind can easily be adapted by the guide system to the load to be transported, in order to be able to optimally secure the load in the luggage compartment without the risk of damage to the roller blind, and therefore secure transport of different loads in a luggage compartment of a motor vehicle is made possible.

The roller blind is configured as an in particular textile fabric which, in the retracted state, is rolled up around the winding spindle and, in the extended state, is at least partially unrolled from the winding spindle. For this purpose, the roller blind can have a winding rod which is rotatable about the winding spindle and to which the fabric is fixedly connected in order to be able to wind up the fabric around the winding rod. In particular, the roller blind can be locked in the extended state, for example with a brake acting on the roller blind, and therefore the roller blind can no longer be extended further during the transport of the load and the forces exerted on the load by the roller blind do not slacken during the transport. The holding action of the roller blind for the load can thereby be retained. For this purpose, the fabric of the roller blind is configured to be correspondingly hard-wearing and wear-proof. The guide system has guide rails which are provided in particular on the left side and on the right side of the luggage compartment and in which the winding spindle can be accommodated in a guided manner. The guide system can form a slotted guide mechanism. By means of the guide system, the winding spindle can be shifted along a predefined displacement path. For the winding spindle, the guide system preferably has a shifting path which runs at least for the most part substantially in the vertical direction. The winding spindle can preferably be shifted substantially parallel to a front delimitation of the luggage compartment, which delimitation is formed in particular by a rear side of a rear seat bench. In a preferred embodiment, the winding spindle is substantially shiftable exclusively in the vertical direction, and therefore the winding spindle is positioned in each relative position at the front end of the luggage compartment, in particular adjacent to the rear wall of the rear seat bench. A gap between the roller blind and the front end of the luggage compartment can thereby be minimized.

In particular, the roller blind has, at an end protruding from the winding spindle, a guide element which is inserted in the guide system. The protruding end of the roller blind can thereby be shifted via the guide system provided for the winding spindle to a defined point where the protruding end of the roller blind can be releasably fastened. This in particular permits automization of the unwinding and winding up of the roller blind by the shiftable winding spindle even in the case of a variable starting position. In particular, the winding spindle and the guide element can share the same guide.

The winding spindle of the roller blind and/or the guide element are/is preferably shiftable in the guide system at least with one portion in the horizontal direction. As a result, the roller blind can be additionally used to divide the luggage compartment. In particular, it is thereby possible to fasten the extended end of the roller blind at points spaced apart from one another in the longitudinal direction.

Particularly preferably, the winding spindle and/or the guide element are/is releasably fixable in a fixed position, in particular in the guide system, wherein locking elements are in particular provided for the releasable fastening of the winding spindle and/or of the guide element. The winding spindle and/or the guide element can thereby be locked in a fixed position at defined points, preferably within the common guide system, in particular with the aid of locking elements provided at the designated points. The locking elements can be configured, for example, as openings into which a hook or bolt as locking bar can in each case be inserted.

In particular, the guide system has a, in particular precisely one, horizontal guide for the predominantly horizontal guidance, wherein at least one, preferably at least two or three, vertical guide(s) to the predominantly vertical guidance protrudes/protrude from the longitudinal guide. The winding spindle which is guided in the guide system can thereby also be shifted in the direction of travel of the motor vehicle, and therefore even a load positioned at the rear end of the luggage compartment can be secured. The extended end of the roller blind guided in the guide system can thereby be fastened at different longitudinal distances from the winding spindle, in particular even at different vertical heights, and therefore differently sized loads can easily be fixed.

The horizontal guide is preferably arranged above and spaced apart from a luggage platform of the luggage compartment. The roller blind can thereby easily delimit a defined volume of the luggage compartment in the manner of a rear parcel shelf.

Particularly preferably, the roller blind is accommodated in a receiving cassette so as to be rotatable about the winding spindle, wherein the receiving cassette is guided in the guide system. The winding spindle of the roller blind is thereby guided in the guide system only indirectly via the receiving cassette. This avoids a relative rotation of the winding spindle in the guide system. The guide system needs only to provide a linear guide, wherein the rotatable mounting of the winding spindle takes place in the receiving cassette.

In particular, the roller blind, in particular the receiving cassette, can be recessed in a receiving compartment, wherein the receiving compartment is in particular provided below the height level of a luggage platform of the luggage compartment. If the roller blind is not required or a particularly large and/or bulky load is intended to be transported, the roller blind can be completely recessed in the receiving compartment, and therefore interaction of the load with the roller blind can be avoided.

The receiving compartment is preferably closeable, in particular with the aid of a pivotably coupled covering flap, wherein the covering flap in the closed state is in particular arranged flush with the surface of the luggage platform of the luggage compartment. When the roller blind is arranged recessed in the receiving compartment, the optical impression can thereby be improved. In addition, a load can be positioned in the region above the roller blind without damaging the roller blind.

Particularly preferably, a shifting actuator 50 for the automated shifting of the roller blind along the guide system and/or a roller blind actuator 51 for the automated winding up and/or unwinding of the roller blind and/or a flap actuator 52 for the automated opening and/or closing of the covering flap are/is provided. The roller blind and/or the extended end of the roller blind can thereby be moved mechanically, for example with the aid of an electrically driven actuator. Manual actuation by hand can thereby be avoided. This permits in particular automatic load securing, as a result of which the safety is improved.

The luggage compartment arrangement 10, which is illustrated in FIG. 1, for a motor vehicle has a luggage compartment 16 which is bounded by a luggage platform 12 and a rear seat bench 14 and which can be in particular a trunk of the motor vehicle. A roller blind 24 which is accommodated in a receiving cassette 20 so as to be rotatable about a winding spindle 22 is arranged in a receiving compartment 18 below the height level of the luggage platform. The receiving compartment 18 is closed with the aid of a covering flap 26 which is flush with the luggage platform 12.

As illustrated in FIG. 2, the covering flap 26 can be opened and the receiving cassette 20 can be moved upward together with the roller blind 24 in a guide system 28. The roller blind 24 can be extended out of the receiving cassette 20 and unwound from the winding spindle 22. The extended end of the roller blind 24 can be fastened in the upper region with a locking element 30, and therefore the roller blind 24 acts in the manner of a rear parcel shelf.

As illustrated in FIG. 3, the receiving cassette 20 can also be positioned in a lower region of the guide system 28 and the extended end of the roller blind 24 can be fastened in the vicinity of the luggage platform 12, for example over half of the length of the luggage compartment 16 in the direction of travel, with a locking element 30. As a result, a smaller load 32 can be fixed in a frictionally locking manner between the roller blind 24 and the luggage platform 12.

As illustrated in FIG. 4, the extended end of the roller blind 24 can alternatively be fastened in the vicinity of the luggage platform 12 to the rear of the motor vehicle with a locking element 30. As a result, a larger load 32 can be fixed in a frictionally locking manner between the roller blind 24 and the luggage platform 12.

Figure 6:
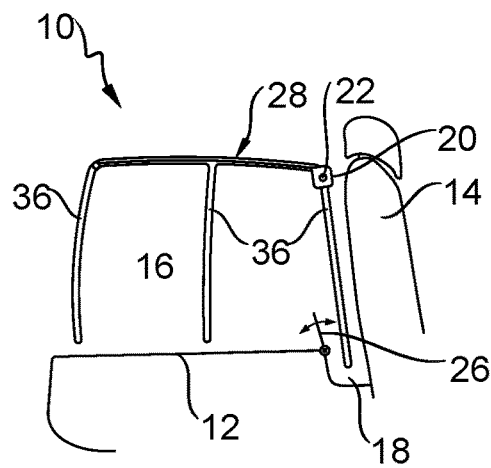
FIG. 6 is a schematic lateral sectional view of the luggage compartment arrangement from FIG. 5 in a second state.
Figure 7:
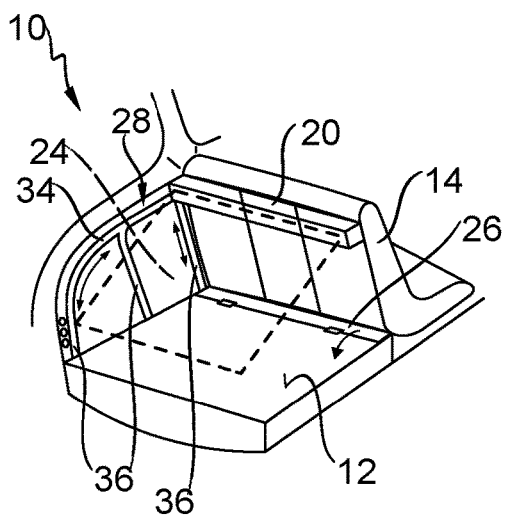
FIG. 7 is a schematic perspective view of the luggage compartment arrangement from FIG. 5 in a third state.
Figure 8:
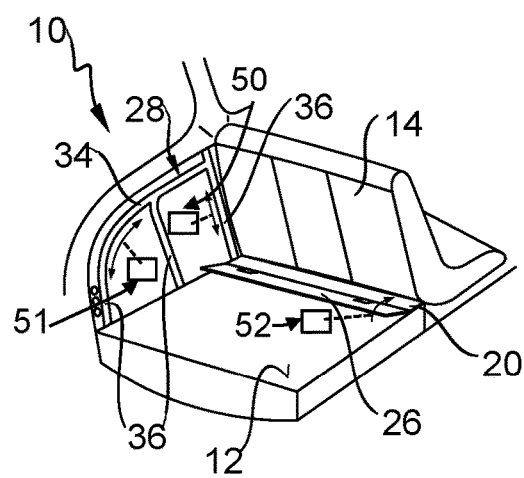
FIG. 8 is a schematic perspective view of the luggage compartment arrangement from FIG. 5 in a fourth state.

In comparison to the previous embodiment of the luggage compartment arrangement 10, in the embodiment, which is illustrated in FIG. 5, of the luggage compartment arrangement 10, the guide system 28 is configured with a horizontal guide 34 which is spaced apart from the luggage platform 12 and from which, for example, three vertical guides 36 emerge downward. As illustrated in FIG. 6, the extended end of the roller blind 24 can be guided in the guide system 28 and moved via the horizontal guide 34 and the vertical guides 36 to the points which have been defined in the previous embodiment of the luggage compartment arrangement 10 by the locking elements. In particular, intermediate positions are also provided for the extended end of the roller blind 24 in the guide system 28, as illustrated in FIG. 7. As illustrated in FIG. 8, the roller blind 24 can be moved up to the receiving cassette 20 or into the receiving cassette 20 which can then be recessed completely in the receiving compartment 18. Also in this embodiment, a smaller load 32 can be fixed in comparison to the situation illustrated in FIG. 3, as illustrated in FIG. 9, and a larger load 32 can be fixed in comparison to the situation illustrated in FIG. 4, as illustrated in FIG. 10. It is basically also possible to move the receiving cassette 20 in the direction of travel via the guide system 28 in order to fix a load 32 at a distance from the rear seat bench 14, as illustrated in FIG. 11.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A luggage compartment arrangement for a motor vehicle, comprising:
   an extendable roller blind configured to cover and/or secure a load in a luggage compartment; and
   a guide system configured to guide, in a position-variable manner, a winding spindle of the roller blind,
   wherein the winding spindle of the roller blind is shiftable in the guide system at least with one portion in a vertical direction;
   wherein the guide system includes a horizontal guide configured to provide predominantly horizontal guidance, and
   wherein the guide system includes at least two longitudinally spaced vertical guides configured to provide predominantly vertical guidance, the vertical guides extending from the horizontal guide.

2. The luggage compartment arrangement as claimed in claim 1, wherein the roller blind includes, at an end protruding from the winding spindle, a guide element configured to be inserted in the guide system.

3. The luggage compartment arrangement as claimed in claim 1, wherein the winding spindle of the roller blind and/or the guide element is shiftable in the guide system at least with one portion in a horizontal direction.

4. The luggage compartment arrangement as claimed in claim 1, wherein the winding spindle and/or the guide element are/is releasably fixable in a fixed position, wherein locking elements are provided for the releasable fastening of the winding spindle and/or of the guide element.

5. The luggage compartment arrangement as claimed in claim 4, wherein the horizontal guide is arranged above and spaced apart from a luggage platform of the luggage compartment.

6. The luggage compartment arrangement as claimed in claim 1, wherein the roller blind is accommodated in a receiving cassette so as to be rotatable about the winding spindle, wherein the receiving cassette is guided in the guide system.

7. The luggage compartment arrangement as claimed in claim 1, wherein the roller blind can be recessed in a receiving compartment, and wherein the receiving compartment is in particular provided below the height level of a luggage platform of the luggage compartment.

8. The luggage compartment arrangement as claimed in claim 7, wherein the receiving compartment is closeable with aid of a pivotably coupled covering flap, wherein the covering flap in a closed state is arranged flush with a surface of the luggage platform of the luggage compartment.

9. The luggage compartment arrangement as claimed in claim 8, wherein a shifting actuator for the automated shifting of the roller blind along the guide system and/or a roller blind actuator for the automated winding up and/or unwinding of the roller blind and/or a flap actuator for the automated opening and/or closing of the covering flap are/is provided.

* * * * *